United States Patent
Koch et al.

(10) Patent No.: US 9,283,824 B2
(45) Date of Patent: Mar. 15, 2016

(54) METHOD FOR CONTROLLING A TORQUE OF A ROLL STABILIZING SYSTEM

(71) Applicant: Dr. Ing. h.c. F. Porsche Aktiengesellschaft, Stuttgart (DE)

(72) Inventors: Thorsten Koch, Schwieberdingen (DE); Hartmut Fischlein, Korntal-Muenchingen (DE); Igor Illg, Renningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/313,491

(22) Filed: Jun. 24, 2014

(65) Prior Publication Data

US 2015/0012177 A1    Jan. 8, 2015

(30) Foreign Application Priority Data

Jul. 5, 2013    (DE) .......................... 10 2013 107 094

(51) Int. Cl.
*B60G 17/016* (2006.01)
*B60G 17/018* (2006.01)
*B60G 17/019* (2006.01)
*B60G 21/055* (2006.01)

(52) U.S. Cl.
CPC .......... *B60G 17/018* (2013.01); *B60G 17/0162* (2013.01); *B60G 17/01908* (2013.01); *B60G 21/0555* (2013.01); *B60G 2202/42* (2013.01); *B60G 2202/44* (2013.01); *B60G 2800/9122* (2013.01)

(58) Field of Classification Search
CPC .......................... B60G 17/00; B60G 17/01908
USPC ...................................................... 701/38, 41
See application file for complete search history.

(56) References Cited

U.S. PATENT DOCUMENTS

| | | | |
|---|---|---|---|
| 2004/0176890 A1* | 9/2004 | Acker et al. | 701/38 |
| 2005/0206100 A1* | 9/2005 | Ohta et al. | 280/5.511 |
| 2006/0049601 A1 | 3/2006 | Matsumoto | |
| 2008/0033612 A1* | 2/2008 | Raab | 701/38 |
| 2009/0008887 A1 | 1/2009 | Buma | |
| 2010/0036597 A1 | 2/2010 | Fiedler et al. | |

FOREIGN PATENT DOCUMENTS

| | | |
|---|---|---|
| DE | 102004035578 A1 | 2/2006 |
| DE | 102006045304 A1 | 4/2008 |
| DE | 112007000288 B4 | 11/2008 |
| DE | 102010052601 A1 | 6/2011 |
| JP | 2007083760 | 4/2007 |
| KR | 100211167 | 7/1999 |

OTHER PUBLICATIONS

German Search Report, dated Feb. 17, 2014, corresponding to counterpart German Patent Application No. 10 2013 107 094.9, with partial English translation.

* cited by examiner

*Primary Examiner* — Luke Huynh
(74) *Attorney, Agent, or Firm* — RatnerPrestia

(57) ABSTRACT

A method for controlling a torque of a roll stabilizing system which acts on a wheel suspension system of a chassis for a vehicle in order to correct a rolling inclination of the bodywork of a vehicle, wherein a spring travel value of at least two wheels of the vehicle is detected. The torque is determined as a function of a difference between the spring travel values of the two wheels, and the determined torque is applied to the wheel suspension system. An actual torque which acts on the wheel suspension system is preferably determined on the basis of the differences between the spring travel values. The actual torque is used to calculate a setpoint torque for a roll stabilizing system.

12 Claims, 2 Drawing Sheets

METHOD FOR CONTROLLING A TORQUE OF A ROLL STABILIZING SYSTEM

CROSS-REFERENCE TO RELATED APPLICATION

This application claims priority to German Patent Application No. 10 2013 107 094.9, filed Jul. 5, 2013, which is incorporated by reference herein in its entirety.

FIELD OF THE INVENTION

The invention relates to a method for controlling a torque of a roll stabilizing system as claimed in patent claim 1 and to a control device as claimed in patent claim 12.

BACKGROUND OF THE INVENTION

US 2005/0206100A1, which is incorporated by reference herein, discloses carrying out roll stabilization of the bodywork of a vehicle using an electric motor. In this electromechanical roll stabilizing system a motor current sensor or a torque sensor is provided. A torque is applied to the wheel suspension system of the chassis of the vehicle as a function of the signal of the motor current sensor or of the torque sensor in order to counteract an inclination of the bodywork.

SUMMARY OF THE INVENTION

Described herein is a method for controlling a torque of a roll stabilizing system which acts on a wheel suspension system of a chassis for a vehicle in order to correct a rolling inclination of the bodywork of a vehicle, wherein a spring travel value of at least two wheels of the vehicle is detected, wherein the torque is determined as a function of a difference between the spring travel values of the two wheels, and wherein the determined torque is applied to the wheel suspension system.

One advantage of the described method is that the torque for the roll stabilizing system can be regulated easily and precisely. This is achieved in that instead of direct measurement of a torque, a difference between the spring travel values of two wheels of the vehicle is used to determine a torque for at least one wheel suspension system, taking into account the differences between the spring travel values of the two wheels. It is therefore not necessary to provide a torque sensor separately in order to measure a torque of the wheel suspension system. Dispensing with the torque sensor permits simplified and cost-effective implementation of the described method. In addition, the installation space can be reduced since no installation space is necessary for the torque sensor. Furthermore, no corresponding components are necessary in a control device for evaluating the sensor signal of the torque sensor. The control device therefore becomes more cost-effective. The differences between the spring travel values can be determined easily and provide a good parameter for the determination of the torque or for the estimation of the actual torque of the wheel suspension system.

The roll stabilization is carried out using an actuator which can be activated electromechanically and which is connected to two stabilizer halves. As already mentioned, the torque for the roll stabilizing system must be regulated easily and precisely. Instead of direct measurement of a torque, there is provision that not only the spring travel values are measured but also the rotation of the actuator is measured. The size of the difference between the spring travel values has a direct effect on the rotation of the actuator, with the result that it is possible to infer the torque of the roll stabilizing system with a measurement of the rotation of the actuator. The differences between the spring travel values and the rotation of the actuator can be determined easily and provide a good parameter for determining the torque or for estimating the actual torque of the wheel suspension system.

In a further embodiment, the spring travel values of two wheels of one axle of the vehicle are detected and used to determine the difference between the spring travel values. The use of the spring travel values of two wheels of one axle of a vehicle permits precise determination of the torque which acts on the wheel suspension system.

In a further embodiment, the wheel suspension systems of the two wheels for which the differences between spring travel values have been detected, each have a corresponding torque applied to them in order to counteract an inclination of the vehicle about a longitudinal axis. In this context it is possible, for example, to increase the distance between the wheel and the bodywork on one side of the axle and to decrease the distance between the wheel and the bodywork on the opposite side of the axle. As a result of the intervention in the wheel suspension systems of the vehicle which are arranged on opposite sides, the stroke which is required for each wheel suspension system is reduced. A torque is preferably applied to the wheel suspension systems on the front and rear axle in order to counteract a rolling inclination and in order to obtain a desired inclination of the bodywork.

In a further embodiment, in addition to the difference between the spring travel values, a spring compression speed of at least one of the wheels is detected and the spring compression speed, in particular differences between the spring compression speeds of at least two wheels, are taken into account during the determination of the actual torque. In this way, the actual torque can be made more precise. As a result, more precise calculation of the setpoint torque can be carried out in order to adjust the desired inclination of the bodywork in a way which is pleasant for the occupants of the vehicle.

In a further embodiment, a body acceleration of the bodywork is detected and taken into account during the determination of the actual torque. As a result, the determination of the actual torque can be made more precise.

In a further embodiment, an actual torque for at least one wheel suspension system for the roll stabilizing system is calculated on the basis of the difference between the spring travel values of the wheels. The calculated actual torque is compared with a setpoint torque of a wheel suspension system. An actuator is actuated as a function of the difference between the actual torque and the setpoint torque in order to apply the setpoint torque to the wheel suspension system. In this way, a simple method for controlling the torque is made available for a roll stabilizing system.

In a further embodiment, an electric motor is used as actuator, wherein the electric motor is operatively connected to the wheel suspension system. The desired torque is applied to the wheel suspension system using the electric motor in order to achieve roll stabilization. Safe and reliable execution of the method is therefore made possible.

In a further embodiment, a parameter of the actuator is detected and taken into account during the determination of the actual torque. For example, a current for the actuator, in particular a current for the electric motor, a position of the actuator, in particular an angular position of a rotor of the electric motor and/or a phase current of the electric motor can be taken into account as parameters. Furthermore, the temperature of the electric motor can be taken into account. These parameters make the determination of the actual torque for the roll stabilizing system more precise.

BRIEF DESCRIPTION OF THE DRAWINGS

The invention will be explained in more detail below with reference to the figures, of which.

DETAILED DESCRIPTION OF THE INVENTION

Figure 1:
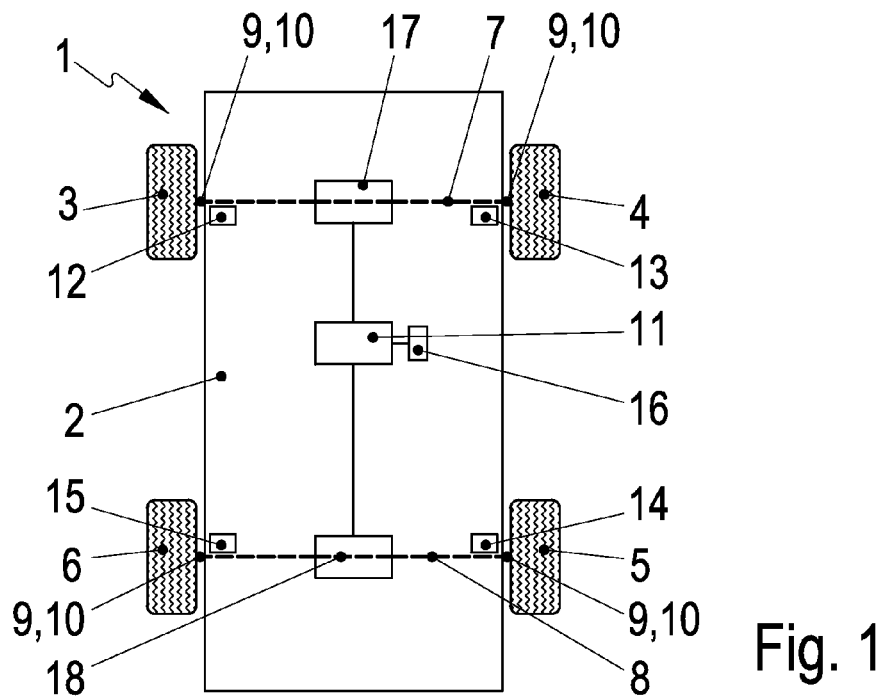
FIG. 1 shows a schematic illustration of a vehicle in a plan view.

FIG. 1 shows a schematic illustration of a vehicle 1, which has a bodywork 2, wherein four wheels 3, 4, 5, 6 are attached to the bodywork 2 via wheel suspension systems 2. In each case, two wheels are arranged on an axle 7, 8 on opposite longitudinal sides of the vehicle 1. Each wheel 3 is arranged so as to be movable with respect to the bodywork 2 in a defined region in at least one plane perpendicularly with respect to the longitudinal axis by means of the wheel suspension system 9. The wheel suspension system 9 has a damper 10 which has a damping effect on changes in the vertical position of the wheel 3, 4, 5, 6 with respect to the bodywork 2. The damper 10 can be embodied in the form of a simple shock absorber or in the form of a variable damper, for example, an electrohydraulic or an electropneumatic damper.

In addition, a control device 11 is schematically illustrated in the vehicle 1. Furthermore, each wheel 3, 4, 5, 6 is respectively assigned a sensor 12, 13, 14, 15 with which spring travel of the respective wheel 3, 4, 5, 6 can be detected. The spring travel of a wheel 3, 4, 5, 6 describes the relative distance between the wheel 3, 4, 5, 6 and the bodywork. The greater the spring travel the shorter the distance between the respective wheel 3, 4, 5, 6 and the bodywork 2. It is therefore irrelevant whether the spring travel or this relative distance is used for the method since the spring travel corresponds to the relative distance even if the reference systems for the spring travel and the relative distance are different. The derivative of the spring travel over time provides the spring compression speed, that is to say that speed with which the respective wheel 3, 4, 5, 6 experiences spring compression, that is to say moves in the direction of the bodywork 2. Alternatively, a further sensor (not illustrated) can also detect the spring compression speed of the respective wheel 3, 4, 5, 6 in this context. The sensors are connected to the control device 11 and transmit the spring travel and/or a measurement signal, on the basis of which the spring travel can be calculated, to the control device 11. The control device 11 is also connected to a memory 16. On the basis of the difference or differences between the spring travel values of the wheels an actual torque for at least one wheel suspension system or for all wheel suspension systems is estimated by the control device 11.

Furthermore, a device 17, 18 is provided with which roll stabilization of at least one of the wheels 3, 4, 5, 6 can be carried out. In the illustrated exemplary embodiment, two corresponding devices 17, 18 are provided for providing roll stabilization of, in each case, at least one wheel, preferably of two wheels of an axle 7, 8 of the vehicle 1. Depending on the selected embodiment, it is also possible to provide just one device 17 which carries out, for example, a roll stabilization for a wheel 3 or two wheels 3, 4 of an axle 7.

Figure 2:
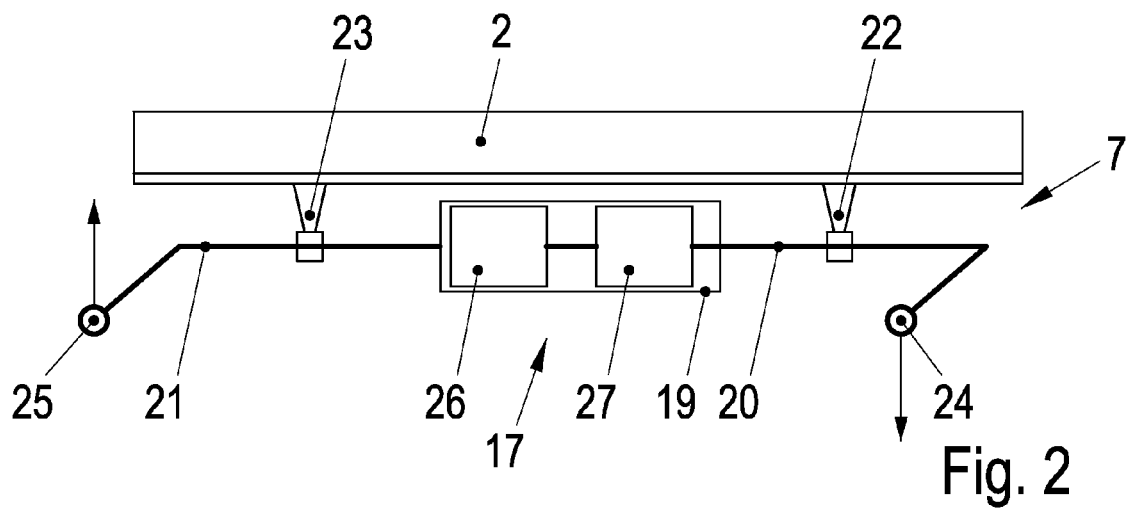
FIG. 2 shows a schematic illustration of a cross section through an axis transversely with respect to a longitudinal axis of the vehicle.

FIG. 2 shows a schematic illustration of a cross section through a first axle 7 of the vehicle 1, wherein an actuator 19 is provided which is connected to a first stabilizer half 20 and to a second stabilizer half 21. The actuator 19 and the first and second stabilizer halves 20, 21 constitute a device 17 for roll stabilization. The first and the second stabilizer halves 20, 21 are embodied, for example, in the form of rods which are each rotatably mounted and supported on the bodywork 2 by means of a first or second bearing 22, 23. The first and second stabilizer halves 20, 21 are arranged along an axis. The first and second stabilizer halves 20, 21 are bent in each case in an end region and are operatively connected at stabilizer ends 24, 25 to a wheel suspension system (not illustrated). In each case, a force transmitting device for transmitting force to the corresponding wheel suspension system is provided at the stabilizer ends 24, 25. For example, the first stabilizer end 24 is assigned to the wheel suspension system of the second wheel 4 and the second stabilizer end 25 is assigned to the wheel suspension system of the first wheel.

The actuator 19 is embodied, for example, in the form of an electric motor 26 and of a transmission 27. The actuator 19 is provided for rotating the stabilizer halves 20, 21 and the stabilizer ends 24, 25 thereof with respect to one another, as a function of actuation by the control device 11. Depending on the selected embodiment, the actuator 19 is designed to apply different torques in opposite directions of rotation to the stabilizer halves 20, 21. In this way, for example, the vertical position of each wheel 3, 4 with respect to the bodywork 2 can be influenced in different directions, i.e. upward in the direction of the bodywork or downward away from the bodywork.

As a result it is possible to orient the bodywork 2 of the vehicle 1 in a plane, for example when traveling through a bend, despite the centrifugal forces which would bring about a rolling inclination of the bodywork. As a result, on an inner side of the bend the roll stabilizing system moves, for example, the wheel upward closer to the bodywork, counter to the rolling inclination. In addition, for example, as a result of the roll stabilizing system the wheel is moved further away from the bodywork 2 on the outside of the bend. For this purpose, corresponding torques are applied to the wheel suspension systems 9 of the wheels using the device 17, 18.

In the illustrated exemplary embodiment, the actuator 19 has two housing parts which can rotate with respect to one another, wherein in each case one stabilizer half 20, 21 is connected to one of the two housing parts so as to rotate with it.

For example, a stator of the electric motor 26 is attached in a first housing part and during operation of the electric motor 26 said stator transmits a torque via the rotor and the mechanical transmission 27 to the second housing part which is connected to the first stabilizer half 20 so as to rotate with it. The electric motor 26 can be designed, for example, such that it can be switched in its rotational direction. In addition, according to the embodiment in FIG. 2, both the wheels of the front axle and the wheels of the rear axle can be provided with an actuator 19 for roll stabilization.

A sensor detects the position of the rotor of the electric motor. The position of the rotor is therefore a measure of the rotation of the actuator 19 and therefore a direct indication of the torque of the roll stabilization.

Figure 3:
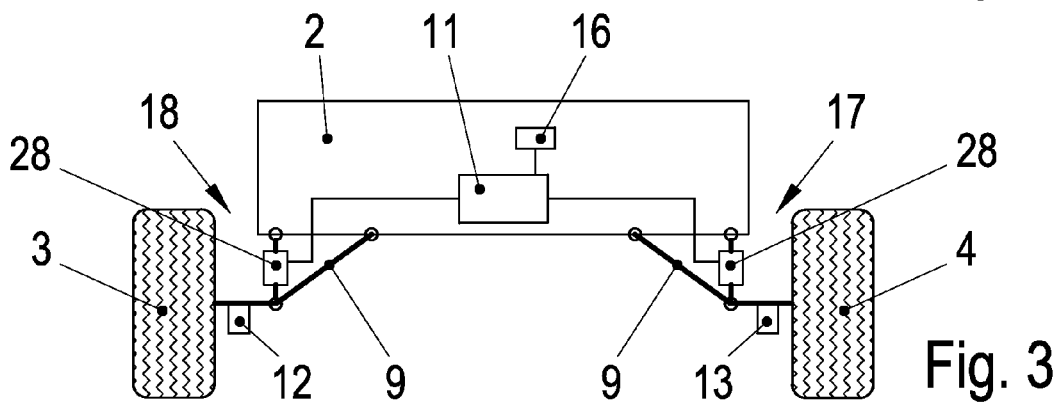
FIG. 3 shows a schematic illustration of a cross section through an axis transversely with respect to a longitudinal axis of a further vehicle.

FIG. 3 shows a further embodiment of a device 17, 18 for roll stabilization of a vehicle. In this embodiment, each wheel suspension system 9 of a wheel 3, 4 is respectively assigned a further actuator 28. The further actuator 28 is clamped in between the bodywork 2 and the wheel suspension system 9.

The further actuators 28 can be embodied, for example, in the form of reciprocating pistons or lever arrangements. The wheel suspension system 9 is connected by means of a bearing to the bodywork 2 so as to be movable at least in a plane perpendicular to the longitudinal axis of the vehicle 1. In each case the wheel 3, 4, 5, 6 is rotatably mounted on the wheel suspension system 9. According to the embodiment illustrated in FIG. 3, all the wheel suspension systems of the vehicle can be provided with corresponding actuators 28.

In addition, FIG. 3 illustrates schematically the sensors 12, 13 which detect a signal for detecting the spring compression travel of the respective wheel 3, 4 and transmit it to the control device 11. The control device 11 is additionally connected to the memory 16 in which characteristic curves, characteristic diagrams and/or calculation methods with which an actual torque for at least one wheel of the vehicle can be determined as a function of parameters such as, for example, a difference between spring travel values between two wheels. As a result, the control device 11 determines, for example as a function of a difference between spring travel values between the first wheel 3 and the second wheel 4, an actual torque for the first wheel suspension system 9 of the first wheel 3 or the second wheel suspension system 9 of the second wheel 4. As a function of the actual torque of the wheel suspension systems, the control device 11 determines a setpoint torque which is applied to the first wheel suspension system 9 of the first wheel 3 and/or the second wheel suspension system 9 of the second wheel 4 using the further actuators 28 in order to counteract a rolling inclination of the bodywork 2 and in order to set a desired inclination of the bodywork. For the calculation of the setpoint torque, the control device 11 accesses characteristic curves, characteristic diagrams and/or data of the memory 16. Various values for desired inclinations of the bodywork and/or setpoint torques for the wheel suspension systems can be stored in the memory 16 as a function of predefined driving situations.

Appropriate values are stored for the desired inclination of the vehicle for a pleasant driving sensation for the occupants of the vehicle and/or for a better position of the vehicle 1 on the road. For example, for a better position of the vehicle on the road, a planar orientation of the bodywork 2 with respect to the roadway is desired. Correspondingly, corresponding torques are correspondingly applied to the wheel suspension systems by the control device 11 in order to bring about the planar orientation of the bodywork 2 and/or in order to change the inclination of the bodywork 2 in the direction of the desired inclination.

In addition, the control device 11 can be designed to detect further parameters of the vehicle and/or of the driving situation of the vehicle in order to be able to carry out improved roll stabilization, that is to say improved calculation of the actual torque of the wheel suspension systems and/or of the setpoint torque for the wheel suspension systems. The control device can also estimate the actual torques for more than two wheel suspension systems, for example, for all the wheel suspension systems of the wheels 3, 4, 5, 6 of the vehicle. In addition, the control device 11 can apply a corresponding setpoint torque to more than two wheel suspension systems, in particular to all the wheel suspension systems of the vehicle, in order to bring about a desired orientation of the bodywork 2. In addition by correspondingly applying setpoint torques to the wheel suspension systems, the control device 11 can, in addition to the orientation of the vehicle with respect to a rolling inclination about the longitudinal axis of the vehicle, also counteract a rolling inclination about a transverse axis of the vehicle. As a result, diving of a front part of the bodywork for example during a braking process can be counteracted by applying corresponding torques to the wheel suspension systems of the front wheels and/or of the rear wheels.

The control device 11 can take into account, for example, the spring compression speed of the wheels, in particular a difference between the spring compression speeds of the wheels of, for example, one axle or of a plurality of axles as further parameters for determining the actual torque of the wheel suspension system or systems. In addition, body acceleration, i.e. a change in a body speed of the bodywork on one side of the vehicle can be detected with a corresponding sensor and taken into account during the determination of the actual torque for the roll stabilization for at least one wheel. For example, the vehicle can have a roll sensor which is suitable for detecting a body acceleration.

Furthermore, the control device 11 can take into account, as a further parameter, a current of the actuator, in particular a current of the electric motor during the determination of the actual torque for at least one wheel suspension system. In addition, the control device 11 can take into account, as a further parameter, a position of the actuator, in particular of the rotor of the electric motor during the determination of the actual torque since this is a measure of the rotation of the actuator. Furthermore, the control device 11 can take into account, as a further parameter, a phase current of the electric motor for the determination of the actual torque. Corresponding characteristic curves, characteristic diagrams, and/or calculation methods are stored in the data memory 16 so that the control device 11 can calculate an actual torque for at least one of the wheel suspension systems of the wheels of the vehicle on the basis of the further parameter or parameters. Corresponding characteristic curves, characteristic diagrams, and/or calculation methods are stored in the data memory 16 so that the control device 11 can calculate, on the basis of further parameters, a setpoint torque for at least one of the wheel suspension systems of the wheels 3, 4, 5, 6 of the vehicle for roll stabilization.

Figure 4:
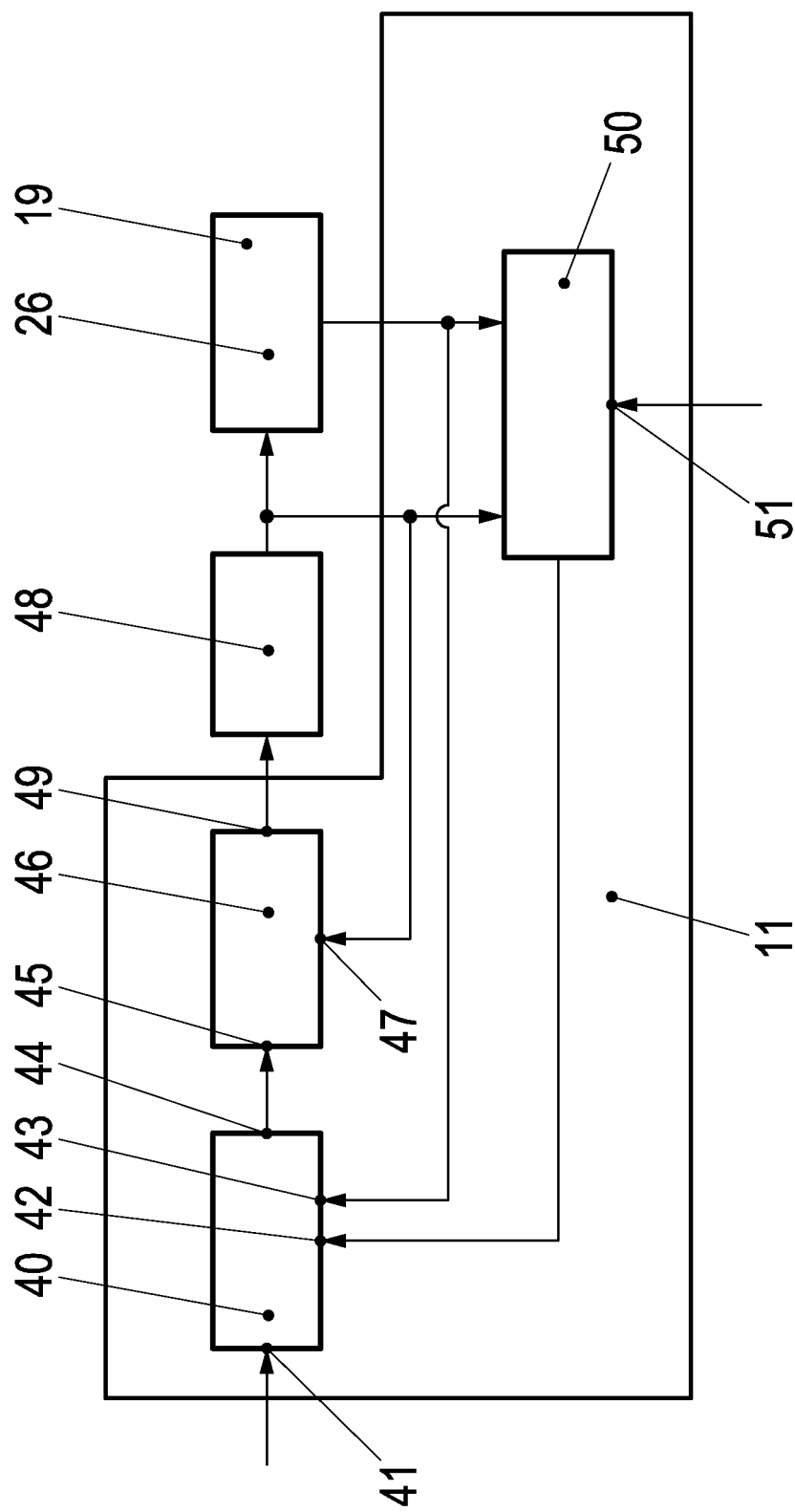
FIG. 4 shows a schematic illustration of the program blocks for carrying out the method.

FIG. 4 shows a schematic illustration of program blocks for carrying out the roll stabilization which is executed by the control device 11. A torque controller 40 is provided wherein a value for a setpoint torque or a value for a spring compression travel is fed to the torque controller 40 at a first input 41. The spring compression travel can relate to a difference between spring compression travel values between two wheels of the bodywork of the vehicle, in particular between two wheels 3, 4 of the first axle or between two wheels 5, 6 of the second axle 7, 8.

In addition, a value for an actual torque is fed to the torque controller 40 via a second input 42. The actual torque is determined, for example, on the basis of parameters of the vehicle and of a driving situation of the vehicle. For this purpose, the driving situation of the vehicle is detected, for example, using sensors, and a corresponding actual value for the torque of at least one wheel suspension system or corresponding actual values for the torques of all the wheel suspension systems of the vehicle are determined on the basis of characteristic curves and/or characteristic diagrams and are made available to the torque controller 40.

Depending on the selected embodiment, a further parameter which can be taken into account during the determination of a setpoint torque is fed to the torque controller 40 via a third input 43. The further parameter can be, for example, the spring compression speed of the wheels, a difference between the spring compression speeds of the wheels, in particular of the wheels of one axle, a body acceleration of the bodywork 2. In addition, the further parameter can also be a parameter of an actuator 19, in particular of an electric motor 26. In this context, a current of the actuator 19 or of the electric motor 26, a position of the actuator 19 or of the rotor of the electric motor 26 and/or a phase current of the electric motor 26 can be, for example, as further parameters.

The torque controller 40 takes into account at least the value at the first input and the value at the second input 42 in order to determine a setpoint torque to be applied to at least one wheel suspension system of the chassis for roll stabilization. Depending on the selected embodiment, the torque controller 40 can also take into account the value or values at the third input 43. In order to calculate the setpoint torque, the torque controller 40 accesses characteristic curves, characteristic diagrams and/or methods for determining a desired torque, i.e. the setpoint torque for at least one wheel suspension system of a wheel 3, 4, 5, 6 of the vehicle which are stored in the memory 16. In particular, the setpoint torque for two wheels of one axle of a vehicle and/or for all the wheels 3, 4, 5, 6 of a vehicle can be determined. A control parameter is output via a first output 44 as a function of the determined setpoint torque.

In the exemplary embodiment used the control parameter is embodied in the form of a setpoint value for a current. The control parameter is fed to a second input 45 of a current controller 46. The current controller 46 determines a control signal for a setpoint value of the current from the supplied control parameter and an actual value for the current which is fed to the current controller 46 via a fourth input 47. The control signal is passed onto the output stage 48 by the current controller 46 via a second output 49. In the illustrated exemplary embodiment a control signal for the current is passed on to the output stage 48. The output stage 48 generates an actual current in accordance with the control signal and actuates the actuator 19 therewith. The actuator 19 can have, for example, an electric motor 26.

Depending on the selected embodiment, an angular position of a rotor of the electric motor 26 and/or an angular speed of the rotor of the electric motor 26 can be signaled to a torque observer 50.

In addition, the angle or the angular speed can additionally be transmitted as further parameters to the torque controller 40. Furthermore, a value for the actual current can be detected and fed to the torque controller 46 via the fourth input 47. In addition, a value of the actual current can likewise be signaled to the torque observer 50. Furthermore, the torque observer 50 receives information about spring travel values of the at least one wheel, of two wheels of an axle or of all the wheels of the vehicle via a fifth input 51. This information is transmitted to the torque observer 50 using the sensors 12 to 15. The torque observer 50 determines a value for an actual torque, which acts on a wheel suspension system, from a difference between the spring travel values of two wheels, in particular of two wheels of an axle of the vehicle.

Depending on the selected embodiment, the torque observer 50 determines in each case an actual torque for the wheel suspension systems of two wheels of an axle of the vehicle as a function of at least one difference between the spring travel values of the two wheels of the axle, and passes on the actual values for the torques of the wheel suspension systems to the torque controller 40.

Depending on the selected embodiment, the torque observer 50 determines in each case an actual torque for the wheel suspension systems of the four wheels of the vehicle as a function of the differences between the spring travel for the four wheels, and passes on these values to the torque controller 40. The value or values for the actual torque are fed to the torque controller 40 by the torque observer 50 via the second input 42.

In addition, the torque observer 50 can additionally receive information about the spring compression speeds of the individual wheels, in particular of all the wheels of the vehicle, from the sensors 12, 13, 14, 15. The torque observer 50 takes into account, for example, the spring compression speed of at least one wheel or of a plurality of wheels during the determination of the actual torque of the wheel suspension system or systems. In addition, an angle and/or an angular speed of a rotor of an electric motor 26 are/is fed to the torque observer depending on the selected embodiment, which rotor applies, as actuator 19, a torque to the wheel suspension system by means of its rotation, in order to carry out roll stabilization. Furthermore, a value for the current, in particular the phase current of an actuator 19, for example of an electric motor 26, with which roll stabilization of a wheel suspension system is carried out can also be fed to the torque observer 50.

The torque observer 50 accesses, for example, characteristic curves, characteristic diagrams and/or calculation programs with which an actual torque of the wheel suspension system can be calculated as a function of the difference between the spring travel values of two wheels, in particular as a function of the difference between the spring travel values of two wheels of an axle. In addition, the characteristic curves, characteristic diagrams and/or calculation methods can also additionally take into account spring compression speeds of the wheels 3, 4, 5, 6 and/or differences in spring travel values not only of the wheels of the same axle but also of the wheels of the respective other axle of the vehicle and/or spring compression speeds of other wheels 3, 4, 5, 6.

Furthermore, the characteristic curves, characteristic diagrams and/or calculation programs can also take into account an angle and/or an angular speed of a rotor of an electric motor 26 and/or a current, in particular the phase current of an actuator 19 of, for example, an electric motor 26, wherein the actuator 19 or the electric motor 26 is used for roll stabilization of the wheel suspension systems.

Depending on the selected embodiment, the torque controller 40, the current controller 46 and the torque observer 50 can be embodied both in the form of an electronic circuit as part of the control device 11 and in the form of a computing program for the control unit 11 and/or from a combination of an electronic circuit and of a computing program.

A setpoint torque which is applied to the wheel suspension system in order to carry out roll stabilization can be determined for each wheel suspension system by means of the described method. In this context, an actual torque is preferably estimated for each wheel suspension system of the vehicle using the torque observer. As a result, measurement of the actual torque at the wheel suspension systems can be dispensed with.

What is claimed:

1. A method for controlling a torque of a roll stabilizing system which acts on a wheel suspension system of a chassis for a vehicle in order to correct a rolling inclination of a bodywork of the vehicle, wherein a spring travel value of at least two wheels of the vehicle is detected, wherein the torque is determined as a function of a difference between the spring travel values of the two wheels, wherein the determined torque is applied to the wheel suspension system, and wherein each spring travel value is a measure of a relative distance between one of the wheels and the bodywork of the vehicle.

2. The method as claimed in claim 1, wherein the spring travel values of two wheels of one axle of a vehicle are detected and used to determine the difference between the spring travel values.

3. The method as claimed in claim 1, wherein the torques for wheel suspension systems of the two wheels are determined as a function of the difference between the spring travel values of the wheels, and wherein the determined torques are applied to the wheel suspension systems of the two wheels.

4. A control device which is designed to carry out the method as claimed in claim 1.

5. The method as claimed in claim 1, wherein a body acceleration of the bodywork is detected and wherein the body acceleration is used to determine the torque.

6. The method as claimed in claim 1, wherein an actual torque is calculated from a difference in the spring travel values of the wheels, wherein the actual torque is compared with a setpoint torque, and wherein an actuator is actuated, in order to apply the setpoint torque to the wheel suspension system.

7. The method as claimed in claim 6, wherein an electric motor is used as an actuator, wherein the electric motor is operatively connected to the wheel suspension system, and wherein the torque is applied to the wheel suspension system using the electric motor.

8. The method as claimed in claim 7, wherein, in addition, a parameter of the electric motor is detected, and wherein the additional parameter is taken into account during the determination of the actual torque.

9. The method as claimed in claim 8, wherein a phase current of the electric motor taken into account as a parameter.

10. The method as claimed in claim 7, wherein a current for the actuator is taken into account as a parameter.

11. A method for controlling a torque of a roll stabilizing system which acts on a wheel suspension system of a chassis for a vehicle in order to correct a rolling inclination of a bodywork of the vehicle, wherein a spring travel value of at least two wheels of the vehicle is detected, wherein the torque is determined as a function of a difference between the spring travel values of the two wheels, wherein the determined torque is applied to the wheel suspension system, wherein a spring compression speed of the wheels is detected, and wherein differences between the spring compression speeds are taken into account during determination of the torque.

12. A method for controlling a torque of a roll stabilizing system which acts on a wheel suspension system of a chassis for a vehicle in order to correct a rolling inclination of a bodywork of the vehicle, wherein a spring travel value of at least two wheels of the vehicle is detected, wherein the torque is determined as a function of a difference between the spring travel values of the two wheels, wherein an electric motor is used as an actuator, wherein the electric motor is operatively connected to the wheel suspension system, and wherein the torque is applied to the wheel suspension system using the electric motor, wherein an angular position of a rotor of the electric motor is taken into account as a measure of the rotation of the actuator which interacts with two rotatable stabilizer halves.

* * * * *